(12) United States Patent
Kauffman

(10) Patent No.: US 9,983,089 B2
(45) Date of Patent: May 29, 2018

(54) PERSISTENT COLOR CHANGE INDICATOR

(71) Applicant: University of Dayton, Dayton, OH (US)

(72) Inventor: Robert E. Kauffman, Centerville, OH (US)

(73) Assignee: University of Dayton, Dayton, OH (US)

( * ) Notice: Subject to any disclaimer, the term of this patent is extended or adjusted under 35 U.S.C. 154(b) by 236 days.

(21) Appl. No.: 15/095,396

(22) Filed: Apr. 11, 2016

(65) Prior Publication Data

US 2016/0298986 A1   Oct. 13, 2016

Related U.S. Application Data

(60) Provisional application No. 62/145,796, filed on Apr. 10, 2015.

(51) Int. Cl.
*G01M 3/14* (2006.01)

(52) U.S. Cl.
CPC ........... *G01M 3/14* (2013.01); *F16L 2201/30* (2013.01)

(58) Field of Classification Search
CPC ....... F16L 2201/30; G01M 3/04; G01M 3/12; G01M 3/14; G01M 3/141; G01M 3/142; G01M 3/143; G01M 3/144; G01M 3/145; G01M 3/146; G01M 3/147; G01M 3/148
USPC .............. 116/200, 206, DIG. 14; 73/40, 49.1
See application file for complete search history.

(56) References Cited

U.S. PATENT DOCUMENTS

| | | | | |
|---|---|---|---|---|
| 2,918,033 A | * | 12/1959 | Snyder | G01M 3/12 116/206 |
| 2,918,893 A | | 12/1959 | Norton | |
| 3,266,920 A | * | 8/1966 | Griffith | C09D 5/00 106/169.11 |
| 3,317,283 A | * | 5/1967 | King | G01M 3/04 116/200 |
| 3,597,263 A | * | 8/1971 | Bancroft et al. | G01M 3/042 116/206 |
| 5,780,721 A | * | 7/1998 | Levens | G01M 3/042 422/537 |

FOREIGN PATENT DOCUMENTS

| | | | | | |
|---|---|---|---|---|---|
| JP | 09126938 A | * | 5/1997 | ............ | G01M 3/04 |
| JP | 2005121452 A | * | 5/2005 | ............ | G01M 3/20 |
| KR | 20030073464 A | * | 9/2003 | ............ | F17C 13/02 |
| KR | 2015117464 A | * | 10/2015 | ............ | G01M 3/20 |

* cited by examiner

*Primary Examiner* — R. A. Smith
(74) *Attorney, Agent, or Firm* — Dinsmore & Shohl, LLP

(57) ABSTRACT

A persistent color change liquid indicator includes a backing layer, a penetration layer, and a reaction layer. The backing layer has an indication color. The penetration layer includes a liquid structure to allow a liquid to travel through the penetration layer to the reaction layer. The penetration layer is opaque when dry and translucent when exposed to the liquid is to allow the indication color to be visible. The reaction layer reacts to the presence of the liquid such that the visibility of the indication color persists after exposure to the liquid ceases.

20 Claims, 15 Drawing Sheets

PERSISTENT COLOR CHANGE INDICATOR

CROSS REFERENCES TO RELATED APPLICATIONS

The present application claims the benefit of priority under 35 U.S.C. § 119(e) to U.S. Provisional Application Ser. No. 62/145,796, filed Apr. 10, 2015.

STATEMENT REGARDING FEDERALLY SPONSORED RESEARCH OR DEVELOPMENT

This invention was made with government support under FA8650-11-D-5610, TO1 awarded by Air Force Research Labs, Materials Integrity Branch (AFRL/RXSA). The government has certain rights in the invention.

BRIEF DESCRIPTION OF THE DRAWINGS

The embodiments set forth in the drawings are illustrative and not intended to limit the subject matter defined by the claims. The following detailed description of the illustrative embodiments can be understood when read in conjunction with the following drawings, where like structure is indicated with like reference numerals and in which:

DETAILED DESCRIPTION

A multi-layered tape persistently changes color when exposed to fuels and other organic liquids so that the location of a slow/intermittent liquid leak can be visually detected during periodic inspections regardless of the liquid color or the length of time between inspections. The tape is useful in visually locating the leaks of fuel bladders in an aircraft to increase flight range, bladders used at portable or persistent fuel depots for marine applications and remote land equipment, automotive and ground transportation fuel tanks, etc. In addition to detecting fuel, the color changing tape may be used to visually detect slow or intermittent leaks from a storage tank, equipment reservoir, pipeline, liquid filled component, mixer, pump, etc. containing both colorless and colored oils, refrigerants, greases, solvents, fluids, etc.

Figure 1:
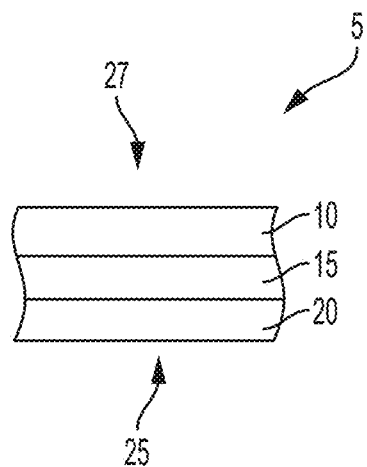
FIG. 1 depicts a liquid indicator according to one or more embodiments shown and described herein.

Referring to FIG. 1, a liquid indicator 5 comprises a penetration layer 10, a backing layer 20, and a reaction layer 15 interposed between the penetration layer 10 and the backing layer 20. The backing layer 20 provides the structural support for the liquid indicator 5 and its individual layers (i.e., the penetration layer 10, the reaction layer 15, etc.). The backing layer 20 has an indication color associated with it. The indication color provides a visual signal that the liquid indicator 5 has been exposed to or is in the presence of an escaping liquid from a container. The escaping liquid is described in greater detail hereinafter. The backing layer 20 may be manufactured with a material comprising the indication color or alternatively, the backing layer 20 may be coated with the indication color. In all embodiments, the penetration layer 10 is coupled to the surface of the backing layer 20 with the indication color.

The backing layer 20 may include a structural adhesive to secure the liquid indicator 5 to a surface. The structural adhesive may be applied to and/or positioned on, an exposed side 25 of the backing layer 20. The exposed side 25 is the side opposite from the side with the indication color in regards to the backing layer 20. In one embodiment, hook and loop fasteners, epoxy, or the like may be used to secure the liquid indicator 5 to a surface. The liquid indicator 5 may be positioned where detecting the escaping liquid is desired.

The penetration layer 10 is opaque in the absence of the escaping liquid (e.g., dry) and translucent in the presence of the escaping liquid (e.g., exposed to or wet with liquid). The penetration layer 10 comprises any material with a liquid structure which allows an escaping liquid to travel through the penetration layer 10 to the reaction layer 15. Examples of the liquid structure include, but are not limited to pores, channels, tubes, or openings in the penetration layer 10; a woven fabric that absorbs and distributes the escaping liquid across the reaction layer 15; or any structure that enables the collection and distribution of the escaping liquid to the reaction layer 15. The penetration layer 10 is not a boundary for the escaping liquid but may serve a protective function. In one embodiment, the penetration layer 10 may be a clear tape with a liquid structure such as perforations for example. The clear tape protects the subsequent layers (i.e., the reaction layer 15 and the backing layer 20) while still allowing the escaping liquid on an outer surface 27 of the penetration layer 10 to reach the reaction layer 15.

The reaction layer 15 may be any substance or material that enables the liquid indicator 5 to indicate exposure or the presence of the escaping liquid. For example, and not by way of limitation, the reaction layer 15 may be a substance that exhibits a chemical change when exposed to or in the presence of the escaping liquid. In another non-limiting example, the reaction layer may be a material or substance that exhibits a physical change (e.g., to shape, or physical state) when exposed to or in the presence of the escaping liquid. For example, and not limited to, the reaction layer 15 may change its properties by swelling or transitioning to a gel thereby filling any adjacent air pockets and/or pores in the penetration layer 10 and connecting the fibers and/or increasing the density of the penetration layer 10. This in turn, increases the quantity of light that may penetrate the penetration layer 10 and reflect off of the backing layer 20. In other words, the reaction layer 15 may permanently change one or more characteristics of the penetration layer 10 when the reaction layer is exposed to or in the presence of the escaping liquid.

The reaction layer 15 may be tailored in composition and/or structure to customize an indication response of the liquid indicator 5. The indication response may include at least one of a quantity of time, a quantity of escaping liquid, reaction layer composition, a visual indication, or the like. The indication response may be tailored to suit custom applications and/or situations as explained in greater detail hereinafter.

Figure 15:
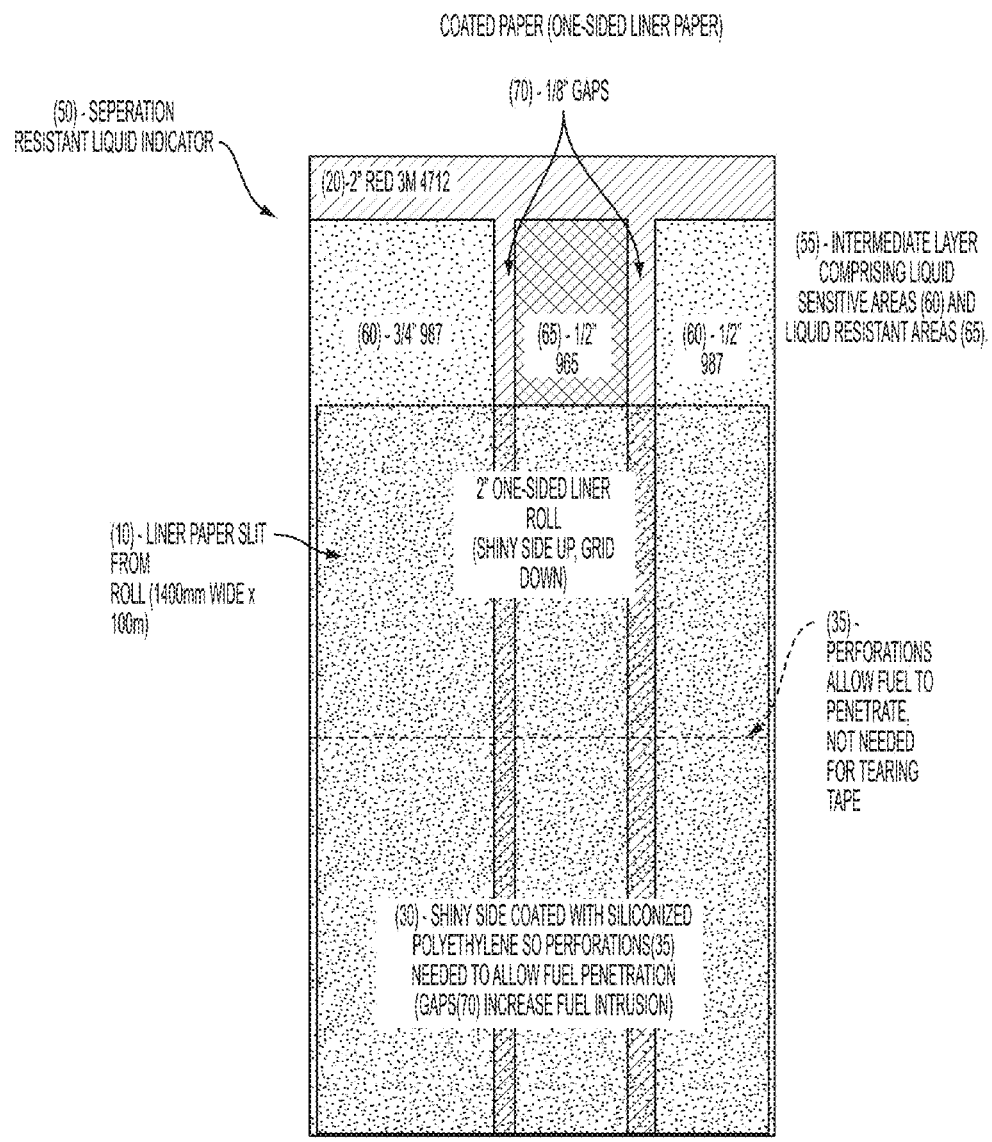
FIG. 15 illustrates another embodiment of a separation resistant liquid indicator according to one or more embodiments shown and described herein.

It should be noted that though the penetration layer 10 transitions from opaque to translucent upon exposure to the escaping liquid, the reaction layer 15 provides a persistent indication of the liquid indicator's 5 exposure to, or the presence of at some previous time, the escaping liquid after the escaping liquid has dried. For example, if the escaping liquid does not reach the reaction layer 15 either because the duration of exposure is too short or the quantity of escaping liquid is too small, the penetration layer 10 may transition from opaque to translucent temporarily. Once dried, however, the penetration layer 10 will transition back to opaque (i.e., a temporary visual indication discussed hereinafter). In an alternate example, if the escaping liquid does make contact with the reaction layer 15, the areas of the reaction layer 15 exposed to the escaping liquid will change in its properties. The amount of change and also whether the indication becomes persistent depends on the composition and/or the structural make-up of the reaction layer 15. In those areas exposed to the liquid, the penetration layer 10 will transition from opaque to translucent and the reaction layer 15 will change in its properties such that the penetration layer 10 will not transition back to opaque once the liquid has dried (i.e., a persistent visual indication discussed hereinafter). It should be noted that translucent means partially transparent. It should also be noted that translucent may include transparent depending on the types of materials used for the liquid indicator 5. Refer to FIG. 15 and associated description hereinafter for more information on transparent materials.

The reaction layer 15 may comprise an adhesive such as, for example, but not limited to, a solvent based adhesive. Examples of a solvent based adhesives include, but are not limited to, acrylic adhesives, polycarbonate adhesives, polystyrene adhesives, PETG plastic adhesives, ABS plastic adhesives, PVC plastic adhesives, butyrate adhesives, polyurethane adhesives, rubber cement adhesives, cyanoates adhesives, super glue, silicone adhesives, and the like.

The reaction layer 15 may comprise a limited quantity of cross-linking agent. The limited cross-linking increases the polymer solubility and increases the susceptibility of the reaction layer 15 to react to the escaping liquid. An adhesive is a polymer dissolved in solvent with a cross-linking agent. As the solvent evaporates, the cross-linking agent creates new bonds between the polymer molecules thereby causing the polymer molecular weight to increase. The increase in molecular weight reduces the polymer solubility in a solvent such as, for example, the escaping liquid. The amount of cross-linking is controlled by the number of reactive sites/double bonds in the dissolved polymer and the quantity of the catalyst. Solvent resistance increases with respect to both a greater the number of reaction sites and a greater extent of the cross-linking reaction with the polymer molecules. The amount of solvent resistance affects the indication response. For example, but not limited to, increased solvent resistance of the reaction layer 15, may lead to a greater quantity of escaping liquid and/or a longer the time during which the liquid indicator 5 must be exposed to the escaping liquid to generate the indication response. In one embodiment, the reaction layer 15 may be an acrylic adhesive. The acrylic adhesive may have limited cross-linking and may react to the escaping liquid by swelling or transitioning to a gel form.

In one embodiment, the reaction layer 15 may be a structural piece that couples the penetration layer 10 with the backing layer 20. For example, the reaction layer 15 may be double sided tape, adhesive layers from transfer tape, and the like. The adhesive used for the double sided tap or transfer tape may be one of those described hereinbefore. In one embodiment, the reaction layer 15 may be a coating or applied to the backing layer 20 and/or the penetration layer 10.

The escaping liquid may be any organic liquid such as: fuel such as gasoline, diesel fuel, Jet A and B fuels, avgas, kerosene; alcohol such as isopropanol, etc.; oil; lubricating oils; grease; refrigerant; hydraulic liquids; ketones such as acetone, MEK, MIBK, etc.; solvents such as acetone, xylene, turpentine, toluene, etc.; chlorinated hydrocarbons such as methylene chloride, etc.; fluorinated hydrocarbons such as R-134, R-124, etc.; and the like. The escaping liquid may also include the gaseous form of the above list of escaping liquids when the escaping gas condenses forming a liquid film wetting the penetration layer of the liquid indicator. In one embodiment, the escaping liquid may be an organic solvent composition such as paint thinner or remover or the like.

Figure 2:
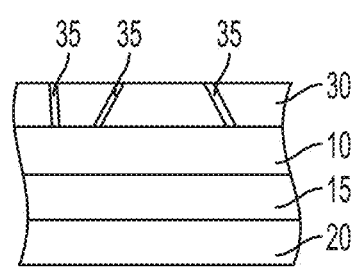
FIG. 2 depicts a cross-section of another embodiment of the liquid indicator according to one or more embodiments shown and described herein.

FIG. 2 is a cross-section of another embodiment of the liquid indicator 5. In this embodiment, the liquid indicator comprises a protection layer 30, the penetration layer 10, the reaction layer 15, and the backing layer 20. The protection layer 30 is a nonporous, chemical resistant layer comprising one or more liquid pathways 35 in which the escaping liquid travels to the penetration layer 10. The liquid pathways 35 may be positioned about the protection layer 30 where the liquid indicator 5 is likely to be exposed to the escaping liquid. For example, the liquid pathways 35 may be positioned down the center of the liquid indicator 5 such that exposure to the escaping liquid under a valve is likely regardless of orientation of the liquid indicator 5 under the valve.

The protection layer 30 may be used to protect the liquid indicator 5 (i.e., the penetration layer 10, the reaction layer 15, and the backing layer 20) when the liquid indicator 5 is rolled onto itself for transportation and storage. For example, the liquid indicator 5 may be a tape that is rolled onto a core. The liquid pathways 35 may be used to aid in tearing the liquid indicator 5 into strips by stringing a plurality of liquid pathways 35, spaced at regular intervals, from one side of the liquid indicator 5 to the other. In this embodiment, tear notches 40 (FIG. 10 and FIG. 13 ("V-cut")

may be included along opposite edges of the liquid indicator 5 to indicate the position of the string of liquid pathways 35 and aid in starting a tear in the liquid pathways 35.

In one embodiment, the protection layer 30 may be coupled to the backing layer 20 directly without a penetration layer 10. In this embodiment, the reaction layer 15 is interposed between the protection layer 30 and the backing layer 20. The protection layer 30 may include one or more liquid pathways 35 as described hereinbefore.

Figure 3:
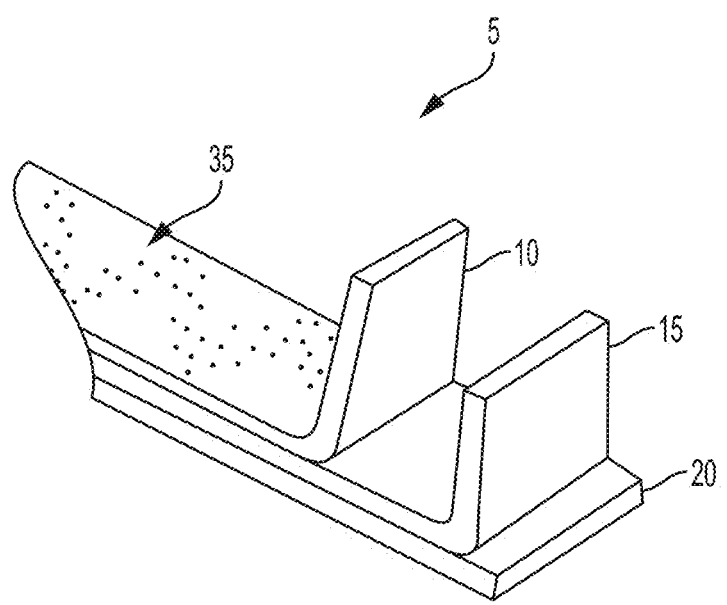
FIG. 3 depicts a top view of the liquid indicator according to one or more embodiments shown and described herein.

FIG. 3 depicts a top view of the liquid indicator 5 with each layer peeled back to show the structure of the liquid indicator 5. As discussed hereinbefore, in one embodiment, the liquid indicator 5 may be in the form of a tape. The liquid indicator 5 may be placed on a vertical surface, a horizontal surface such as hanging underneath a piece of equipment or on the floor, or any other orientation or angles structure. The protection layer 30 is shown with a pattern of liquid pathways 35. It should be understood that the pattern is for illustrative purposes only and the pattern of liquid pathways 35, if used, may take on any form.

Figure 4:
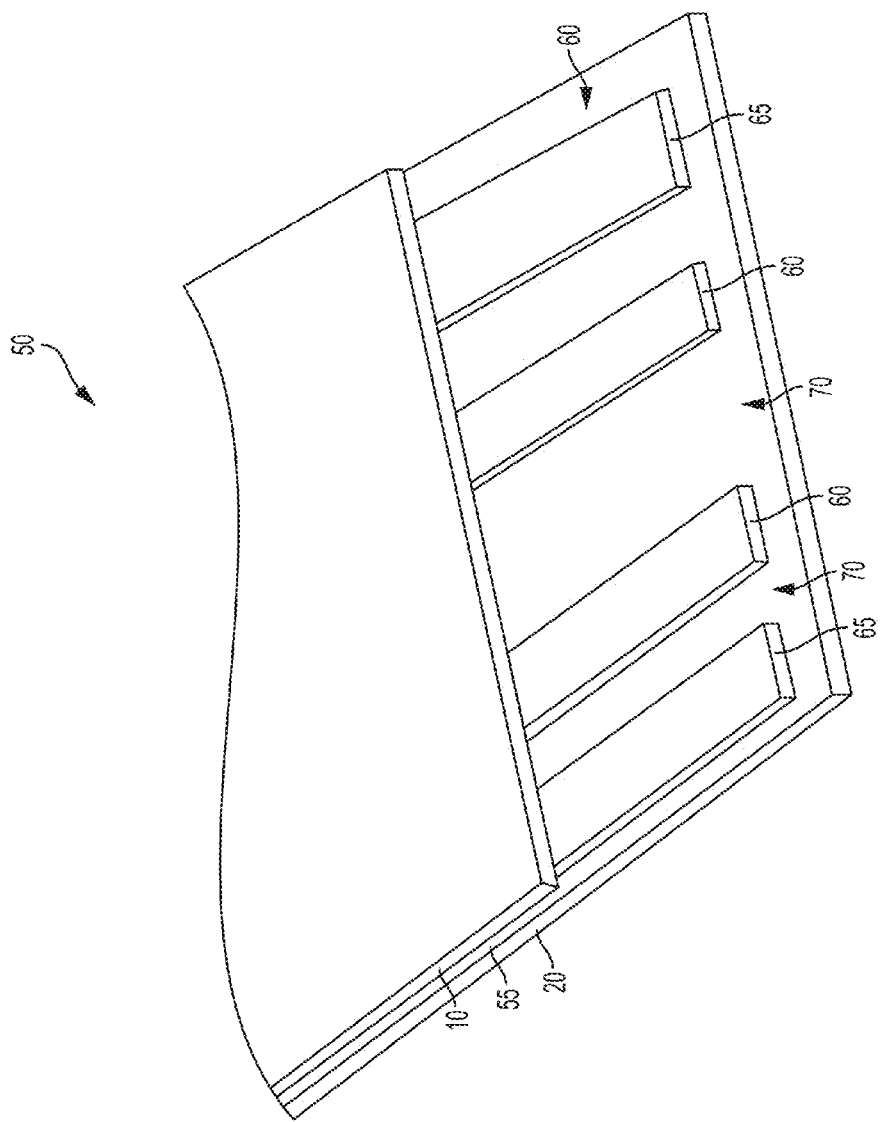
FIG. 4 is an isometric view of a separation resistant liquid indicator according to one or more embodiments shown and described herein.

FIG. 4 is an isometric view of a separation resistant liquid indicator 50. The separation resistant liquid indicator 50 comprises a penetration layer 10, a backing layer 20, and an intermediate layer 55. The intermediate layer 55 comprises one or more liquid sensitive areas 60 and one or more liquid resistant areas 65. The one or more liquid sensitive areas 60 are described hereinbefore in regards to the reaction layer 15 (FIG. 1) and may be constructed from any of the materials described hereinbefore in regards to the reaction layer 15. Without the one or more liquid resistant areas 65, the one or more liquid sensitive areas 60 or the reaction layer 15 of FIG. 1, may allow the penetration layer 10 to be pulled from the backing layer 20 when exposed to the liquid for several hours. Still referring to FIG. 4, the one or more liquid resistant areas 65 do not react with the escaping liquid and do not allow the separation of the penetration layer 10 from the backing layer 20, regardless of duration of exposure of the one or more liquid resistant areas 65 to the liquid. In one embodiment, a gap 70 may be used in the intermediate layer 55 between the one or more liquid sensitive areas 60 and the one or more liquid resistant areas 65. The gaps 70 may be channels which improve the escaping liquid penetration by creating pathways in the intermediate layer 55 for the escaping liquid to penetrate and flow between the one or more liquid sensitive areas 60 and the one or more liquid resistant areas 65.

Figure 5:
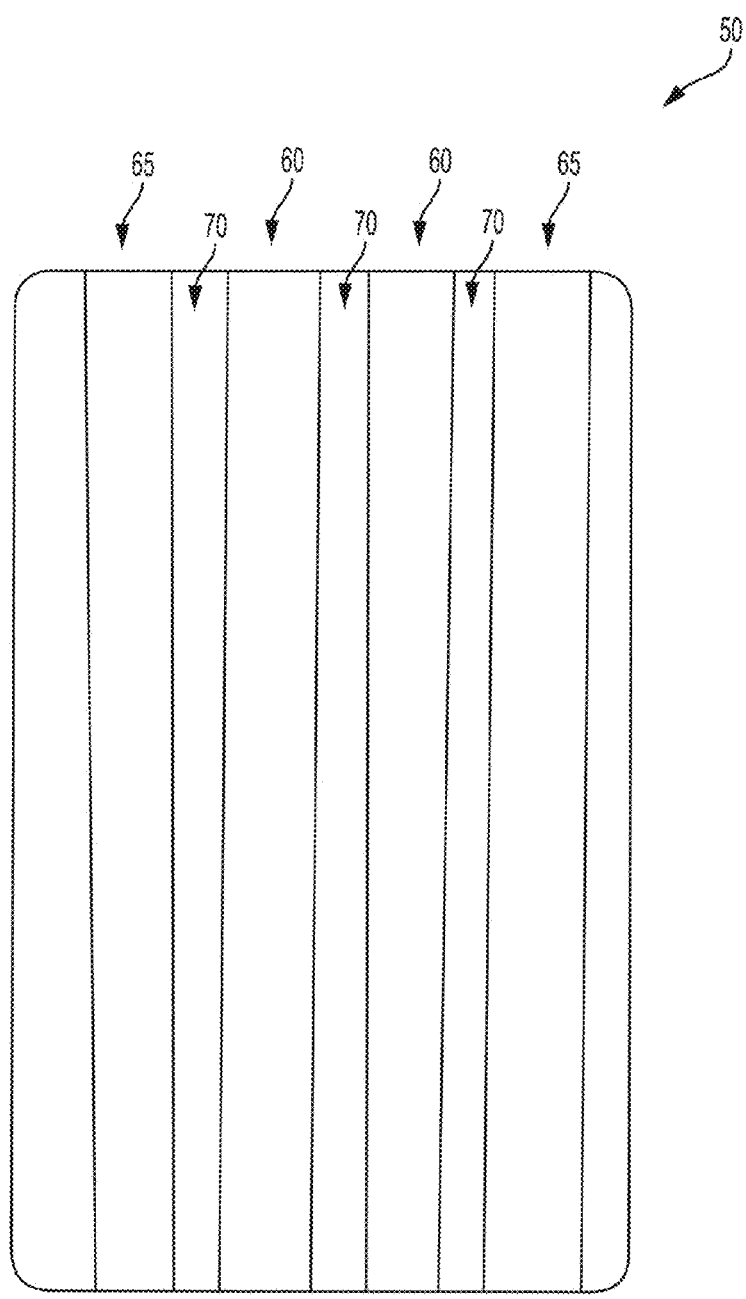
FIG. 5 is a top view of the separation resistant liquid indicator according to one or more embodiments shown and described herein.

FIG. 5 is a top view of the separation resistant liquid indicator 50. FIG. 5 depicts the one or more liquid sensitive areas 60 and the one or more liquid resistant areas 65 as strips that run the length of the separation resistant liquid indicator 50. However, it should be understood that the one or more liquid sensitive areas 60 and the one or more liquid resistant areas 65 may be of any shape or size.

Referring again to FIG. 1, in one embodiment, the liquid indicator 5 may include a porous vent tape as the penetration layer 10 with an acrylic adhesive as the reaction layer 15, and a red colored vinyl tape for the backing layer 20. Vent tape is an example of a penetration layer 10 that comprises a fuel-reactive adhesive that eliminates the necessity of a separate reaction layer 15. The vent tape comprises a liquid structure designed to allow air, not dust, to pass through which allows the escaping liquid to penetrate to the fuel reactive adhesive. The vent tape, when applied to a backing layer 20 with an indication layer, is opaque, when dry, and serves to hide the indication color of the backing layer 20 beneath. For example, but not limited to, the backing layer 20 may be a vinyl tape with a red indication color. When the liquid indicator 5 is exposed to an escaping liquid such as fuel for example, the vent tape transitions from opaque to translucent where exposed. In other words, where the penetration layer 10 (i.e., vent tape) is exposed to the fuel, the indication color (i.e., red) is visible. Material examples include 3M® Vent Tape 394 for the penetration layer 10 and 3M® Vinyl Tape 471, 3M® Vinyl Tape 4712, New Pig® PLS1474, or ULINE® Industrial Vinyl Safety Tape #S-7189 for the backing layer 20.

In one embodiment, the indication color may indicate a path of the escaping liquid across the liquid indicator 5. The path may be indicated regardless of the amount of escaping liquid that flows along that path. Alternatively, if the liquid indicator 5 in this example was submerged in escaping liquid, the indication color would be visible across the whole surface of the liquid indicator 5. If the liquid indicator 5 remained submerged in escaping liquid, the penetration layer 10 may separate from the backing layer 20.

Still referring to FIG. 1, in one embodiment, the penetration layer 10 may be a woven material such as, for example, but not limited to, a ribbon or slitted fabric of different weaves and finished such as nylon, polyester, cotton, cotton blend, and the like. In one embodiment, the penetration layer 10 may be a porous material such as, for example, but not limited to, polyethylene mesh, polyester mesh, non-absorbent paper, absorbent paper, or the like. The polyester mesh may be vent tape for example if the polyester mesh includes an adhesive. The non-absorbent paper may be, for example, but not limited to, copier paper, receipt paper, butcher paper or the like. The absorbent paper may be, for example, but not limited to, absorbent paper, coated paper, tissue paper or the like. The ribbon may be a grosgrain ribbon made from nylon, polyester, cotton, or the like.

The penetration layer 10 is opaque and has a layer color that contrasts with the indication color of the backing layer 20. The penetration layer 10 may indicate the presence of a liquid anywhere on its outer surface 27. For example if the indication color is red, the layer color may be white. Other contrasting colors may include, but not limited to, black and yellow, black and white, white and blue, white and green, red and yellow, and the like. In one embodiment, the indication color choice may depend on the surface to which liquid indicator 5 is secured to. When the liquid indicator 5 is exposed to or in the presence of the escaping liquid, the liquid indicator 5 may provide a visible contrast between the indication color and surface color. In one embodiment, the liquid indicator 5 may match the surface when it is not exposed to or in the presence of the escaping liquid (i.e., dry) such that the liquid indicator 5 blends in with the surface until it is exposed to the escaping liquid.

As explained hereinbefore, the indication response may include at least one of a quantity of time, a quantity of escaping liquid, reaction layer composition, a visual indication, or the like and may be tailored to suit custom applications and/or situations. The quantity of time may comprise at least one of a quantity of indication time and a quantity of persistent time. The quantity of indication time is measured from first exposure of the liquid indicator 5 to the escaping liquid to when the liquid indicator 5 provides a temporary visual indication of the exposure. The temporary visual indication may comprise visual indication that the liquid indicator 5 is currently being exposed to or in the presence of the escaping liquid or within a period of drying time from when the liquid indicator 5 was last exposed to or in the presence of the escaping liquid. The persistent time is measured from first exposure of the liquid indicator 5 to the escaping liquid to when the liquid indicator 5 provides a persistent visual indication. The persistent visual indication may comprise visual indication that, at some point in time, the liquid indicator 5 was exposed to or in the presence of the escaping liquid. Visual indication may comprise, for example, at least one of a change in color, a change in shape, destruction, and separation of the layers of the liquid indicator 5.

The quantity of time may be tailored based on the structure of the liquid indicator 5. For example, and not by way of limitation, the reaction layer 15 may vary in thickness, size, and shape to tailor the quantity of time. In one embodiment, and in reference to FIG. 2, the quantity of liquid pathways 35 in the penetration layer 10 may be tailored to vary the quantity of time. The quantity of the liquid pathways 35 may likewise be varied to customize a quantity of escaping liquid needed to generate an indication response from the liquid indicator 5. For example, and not by way of limitation, the quantity of liquid pathways 35 in the penetration layer 10 may be varied to define the indication time or the persistent time as discussed hereinbefore. In this example, an increase in the quantity of liquid pathways 35 may decrease the indication time, the persistent time, or both. Conversely, a decrease in the quantity of liquid pathways may increase the indication time, the persistence time, or both. In another example, a pattern of liquid pathways 35 in the penetration layer 10 may be used to tailor the indication response of the liquid indicator 5. For example, and not by way of limitation, the pattern of liquid pathways 35 may be tailored for a spray of escaping liquid as opposed to a pattern that is tailored to for a drip. The pattern may also be tailored depending on placement of the liquid indicator 5 in relation to the area to be monitored for a leak of escaping liquid. In one embodiment, the pattern may vary in density of the liquid pathways 35.

In one embodiment, the tightness of the liquid structure of the penetration layer 10 may be tailored to vary the quantity of time. For example, and not by way of limitation, the penetration layer 10 may be a woven material and the weave may be chosen based on the quantity of time it takes for the escaping liquid to travel through the penetration layer 10 to the reaction layer 15.

In one embodiment, the liquid indicator 5 may be tailored such that a specific quantity of escaping liquid is required to maintain a persistent indication. The indication response may be defined by the structure of the liquid indicator 5 as described hereinbefore in relation to the intermediate layer 55.

In one embodiment, the solvency of the reaction layer 15 may be tailored as described hereinbefore in relation to the reaction layer 15. For example, tailoring the reaction layer 15 may be accomplished either with the type of adhesive chosen or by the chemical composition of the reaction layer 15 being customize to react to a specific escaping liquid.

It should be noted that water will not persistently change the color of liquid indicator since water cannot swell and/or dissolve the reaction layer 15. The surface energy of penetration layer or the protection layer may be used to select the type of escaping liquid allowed to reach the reaction layer. It should be noted that in regard to "surface energy," a lower surface energy material, such as water, will spontaneously wet out a higher energy surface, such as the unwaxed hood of a car. However, a waxed hood or a polyethylene mesh has a lower surface energy than water. Therefore, the water beads up rather than wet out, reducing its contact area with the surface. For example, and not limited to, water will bead up on polyethylene mesh while fuel penetrates. For another non-limiting example, water may bead up on a siliconized polyethylene (e.g., one-sided liner) or high density polyethylene (e.g., wax coating, freezer paper, etc.) while fuel penetrates.

Experimental Results

Figure 6:
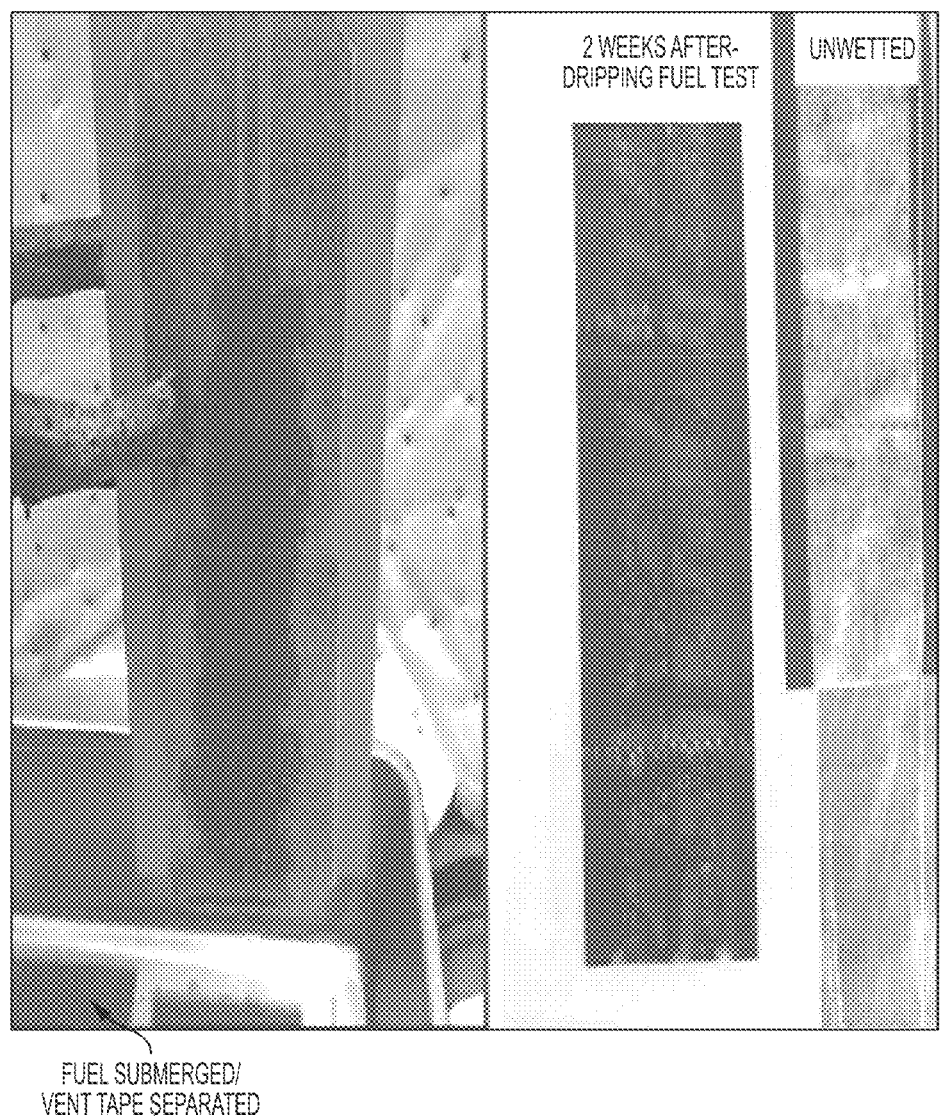
FIG. 6 depicts a two-layer fuel indicating tape according to one or more embodiments shown and described herein.

Referring to FIG. 6, with reference being made to FIG. 1, the liquid indicator tape design applied highly porous vent tape (2" wide 3M 394 or the like) onto red vinyl tape [2" wide 3M 471 (no liner)/4712 (with liner), New Pig PLS 1474, U-Line S-7189, or the like]. The two-layered tape shown in FIG. 6 (left side) was perforated and indented every 3" to allow the tape to be torn easily. When dry, the surface of the liquid indicator tape had a rough, whitish look (upper portion of left tape in FIG. 6). When wetted by the fuel (i.e., escaping liquid) dripping from the glass tip, the liquid indicator tape appeared smooth, bright red along the path of the flowing fuel. The fuel path remained bright red regardless of the amount of leaked fuel.

Although the vent tape covered vinyl liquid indicator tape in FIG. 6 produced a successful fuel indicating tape, the color change was not persistent for leaking fuel. After 4 hours at room temperature, the fuel wetted areas of the liquid indicator tape dried (fuel evaporated) changing from smooth, bright red back to rough, whitish in appearance. Consequently, the two-layered vent tape/colored vinyl tape construction would produce an effective leak detection tape for oils and other nonvolatile liquids regardless of the leak or inspection variables, i.e., leaking liquid path apparent for intermittent as well as continuous leaks inspected at short or long intervals. However, the two-layered tape would only be useful for fuel and other volatile liquid leak detection if the leak was continuous or was intermittent with short intervals between liquid flows.

Referring now to the lower left side of FIG. 6 if the two layered liquid indicator tape was submerged in fuel, the entire tape immediately turned to bright red as the vent tape was wetted by the fuel. After a couple of hours of submersion, the vent tape separated from the vinyl tape causing a persistent change to bright red.

Referring now to the right side of FIG. 6, to produce a fuel indicating tape that performed well regardless of the liquid, leak, or inspection variables, a three-layered tape was produced by applying a clear (nonporous) 2" wide polyester tape to a two-layered tape (vent tape applied to dark blue vinyl tape). Any clear tape can be used; 3M 853 was selected due to the high chemical resistance of its acrylic adhesive (i.e., an acrylic adhesive with a high degree of cross-linking). The three-layered tape was perforated (i.e., liquid pathways 35, FIG. 2) by hand using a Clover Tracing Wheel with Serrated Edges every 2" to allow fuel penetration (clear tape non-porous) as well as easy tearing. Again, the dry fuel indicating tape had a whitish look which turned to the color of the underlying vinyl tape (dark blue) when wetted with fuel (FIG. 6, right side). In contrast to the two-layered red tape, the color change of the three-layered tape was persistent (dark blue color change in FIG. 6 after 2 weeks). When compared to the two layered tape, the three-layered tape did not separate into different layers even after several days of submersion in fuel due to the high fuel resistance of the adhesive layer between the 3M853 tape (i.e., protection layer) and vinyl substrate (i.e. backing layer).

Although the clear tape (protection layer) enabled the two layered tape to undergo a persistent color change and inhibited tape separation after days of fuel submersion, the clear tape reduced the capability of the three-layered tape to detect fuel leaks. If the fuel flow across the tape did not contact a perforation/cut end, the tape would not react to the presence of the fuel. In order to produce a liquid indicating tape that underwent a color change regardless of where the escaping liquid made contact, three-layered tapes were produced made by adhering opaque, woven white ribbon (i.e., the penetration layer)(e.g., satin or grosgrain ribbon made from nylon, polyester, cotton, etc.) to red vinyl tape (the backing layer) using different types of adhesives (the reaction layer)(e.g., double-sided tapes, adhesive layers (no backing) from transfer tapes, solvent based adhesives, etc.).

Figure 7:
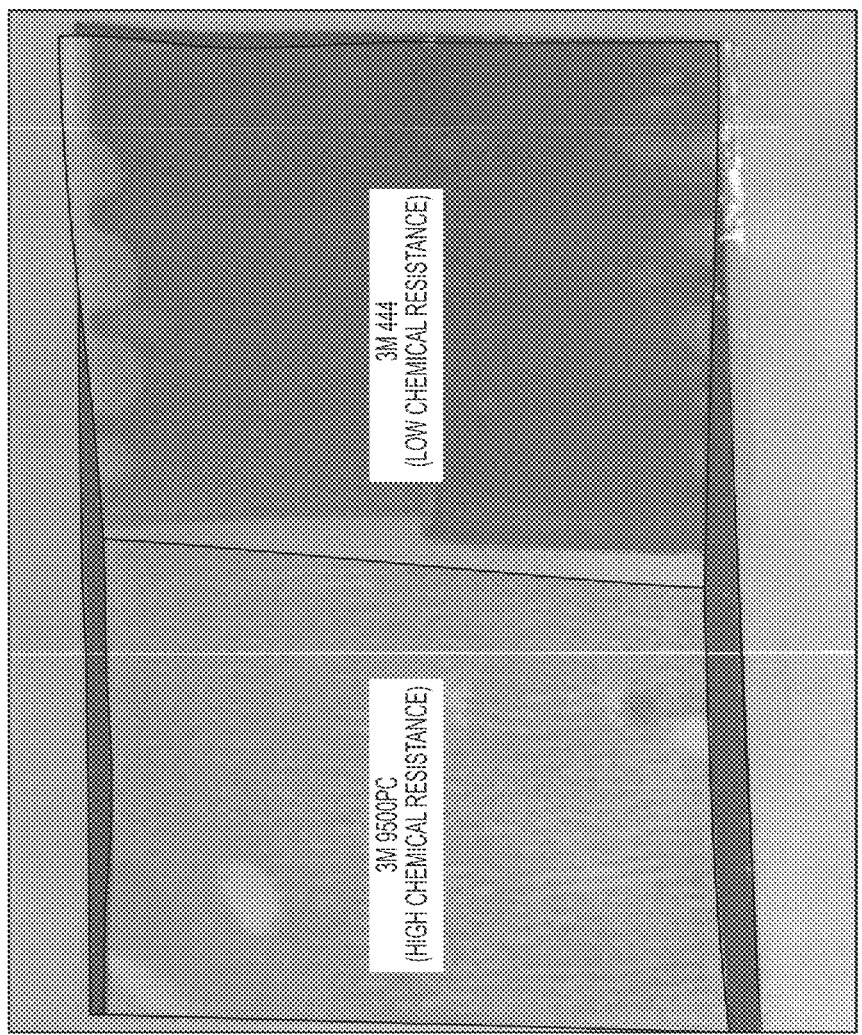
FIG. 7 depicts a multilayer fuel indicating tape according to one or more embodiments shown and described herein.

In one embodiment, the penetration layer is a white ribbon. When the white ribbon was wetted with fuel or other organic liquid, the wetted areas of the ribbon immediately became transparent revealing the color of the underlying vinyl tape. In other words, the apparent, visual color of multilayered tape changed from white to red. Whether the color change was temporary or persistent, depended on the adhesive used to adhere the white ribbon to the vinyl tape. As shown in FIG. 7, when a double-sided tape with a chemical resistant acrylic adhesive (3M 9500PC) was used to adhere the white ribbon, the three-layered tape started to revert back to white after allowing the fuel to evaporate for 4 hours. However, if a double-sided acrylic tape with poor chemical resistance (3M 444 adhesive gels in presence of fuel) was used to adhere the white ribbon, the three layered tape remained red in FIG. 7 after 4 hours of fuel evaporation (color change was still evident after 1 month). Consequently, the permanency of the fuel indicating tape's color change is controlled by the type of adhesive used to adhere the white ribbon to the vinyl tape.

Figure 8:
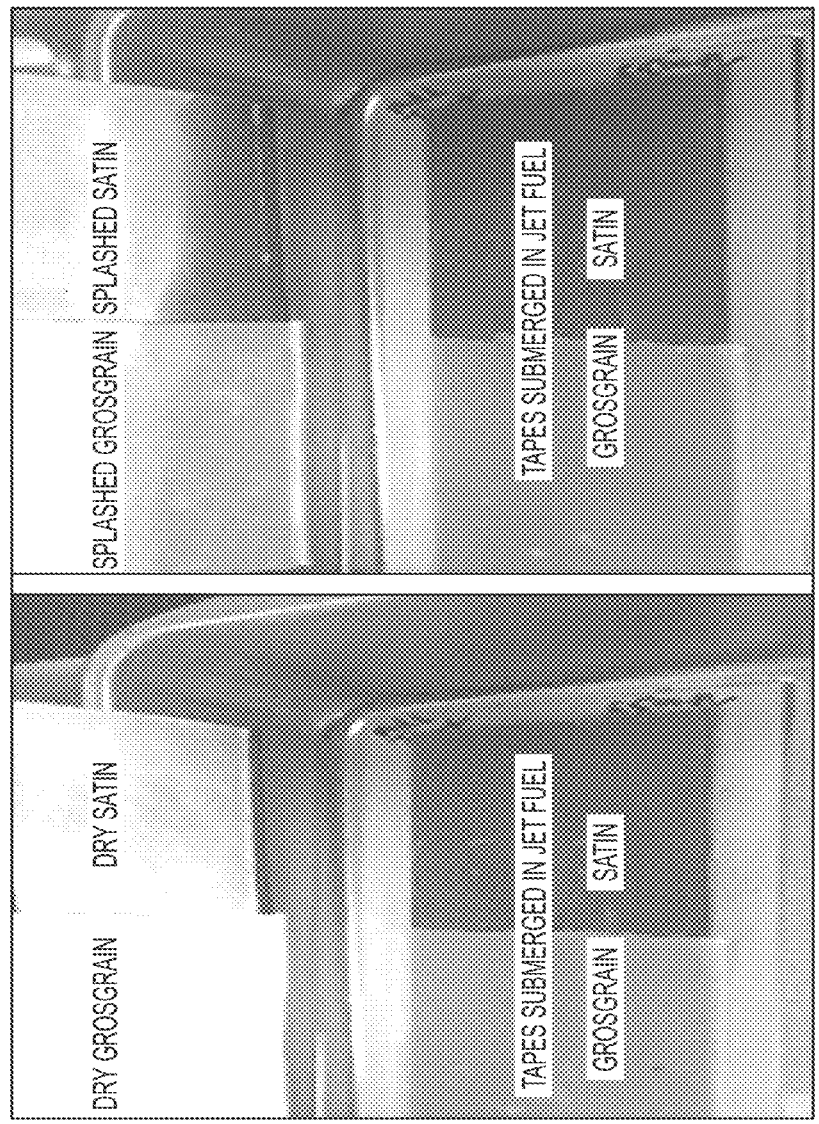
FIG. 8 depicts a multilayer fuel indicating tape exposed to fuel according to one or more embodiments shown and described herein.

In another embodiment, multilayered tapes were produced using a red vinyl tape (i.e., the backing layer) and two different types of white ribbons (i.e., the penetration layer): grosgrain (polyester) and satin (nylon) along with two different transfer tapes (i.e., reaction layer) with different chemical resistances: 3M 924 (poor resistance) and 3M 467MP (high resistance). When the fuel indicating tape is dry, the multilayered tapes appear white (thicker grosgrain opaque) to light pink (thinner satin ribbon translucent) as shown in FIG. 8.

Figure 9:
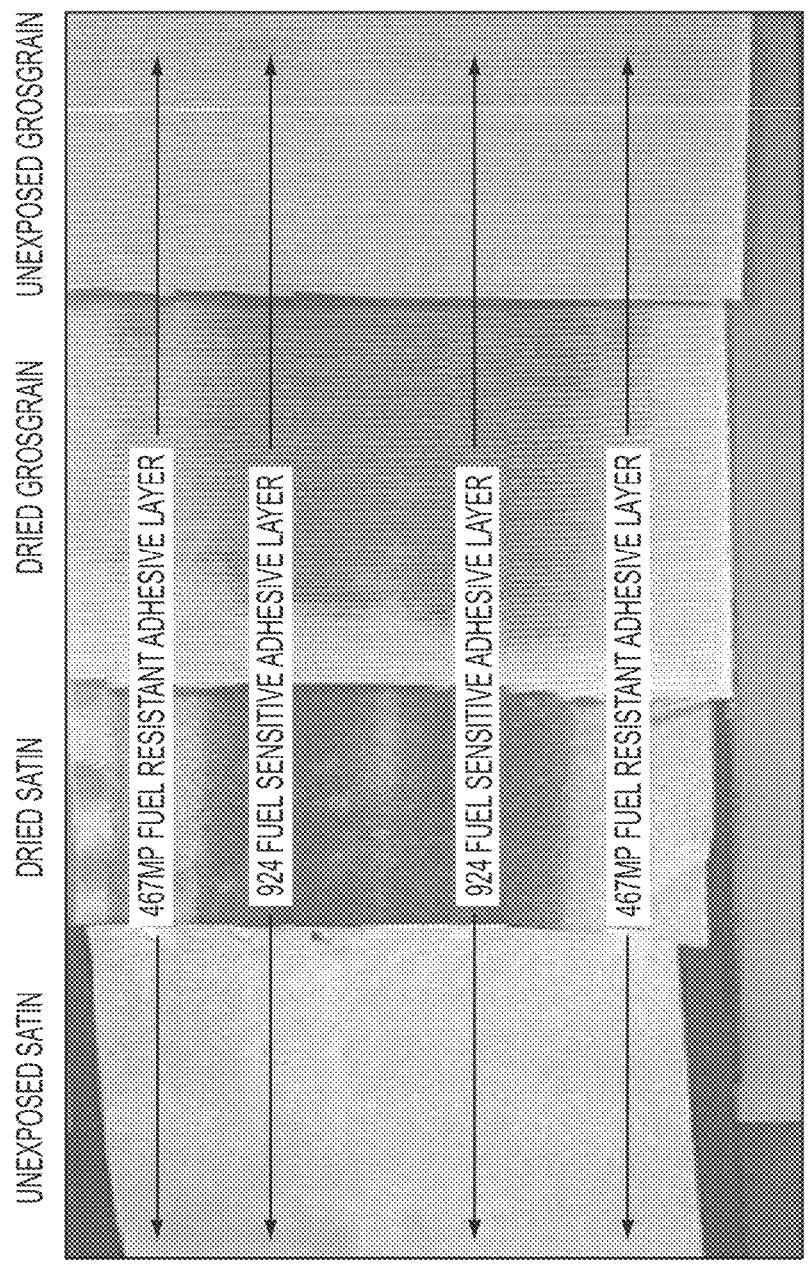
FIG. 9 depicts the multilayer fuel indicating tape with different adhesives according to one or more embodiments shown and described herein.

When the multilayered tapes are splashed with fuel (FIG. 8 upper right) only the surfaces wetted with fuel change color (i.e., indication color). Since the amount of fuel exposure was minimal (did not swell the 3M 924 adhesive), the tapes revert back to their original white/light pink colors in a few minutes as the fuel drains away. However, when the multilayered tapes are submerged in fuel in FIG. 8, the entire surface changes color dependent on the design/thickness of the ribbon, i.e., thin satin ribbon turns from slightly pink to deep red while the thicker grosgrain ribbon turns from white to deep pink. When the submerged tapes were removed from the pan and allowed to dry for eight hours, the areas of the ribbons adhered by the chemical resistant 3M 476MP returned to white as shown in FIG. 9 while the sections of tape that were adhered by 3M 924 (gels in presence of fuel) remained transparent forming a persistent (still red/pink after 30 days) stripe directly hereinbefore the gelled adhesive layer.

Consequently, the fuel indicating tapes constructed from white ribbons, combination of acrylic adhesives, and red vinyl tape undergo a color change based on the degree of fuel exposure: splashed versus submersion, length of time since exposure, etc. Potentially, the different type of color changes could be used to better identify the source of the fuel leak. For example, a compartment with the leaking bladder should have greatest overall color change (checked soon after landing) and/or persistent change (checked days after landing).

In addition to providing a time comparative color change, the fuel resistant adhesive (3M 467MP adhesive) inhibits the separation of the tape during fuel exposure/submersion. The pictures of the submerged tapes in FIG. 9 were taken after one day of fuel submersion. Tweezers were used periodically to try to pull the ribbon (i.e., penetration layer) away from the vinyl tape (i.e., backing layer) and to pull the vinyl tape from the MIL-C-27725 coated aluminum panels, i.e., picture shows the tape could not be separated. However, after fuel submersion for 2-3 days, the white ribbon could be pulled from the red vinyl tape. If the fuel leak application requires that the ribbon does not separate from the vinyl tape under mechanical loads such as rubbing or pulling for example, then 3M 965 transfer tape, which is highly cross-linked and designed specifically to be fuel resistant, can be used in place of the 467MP to produce a tape that stays intact after 1 week of submersion in fuel or other high solvency liquids.

Figure 10:
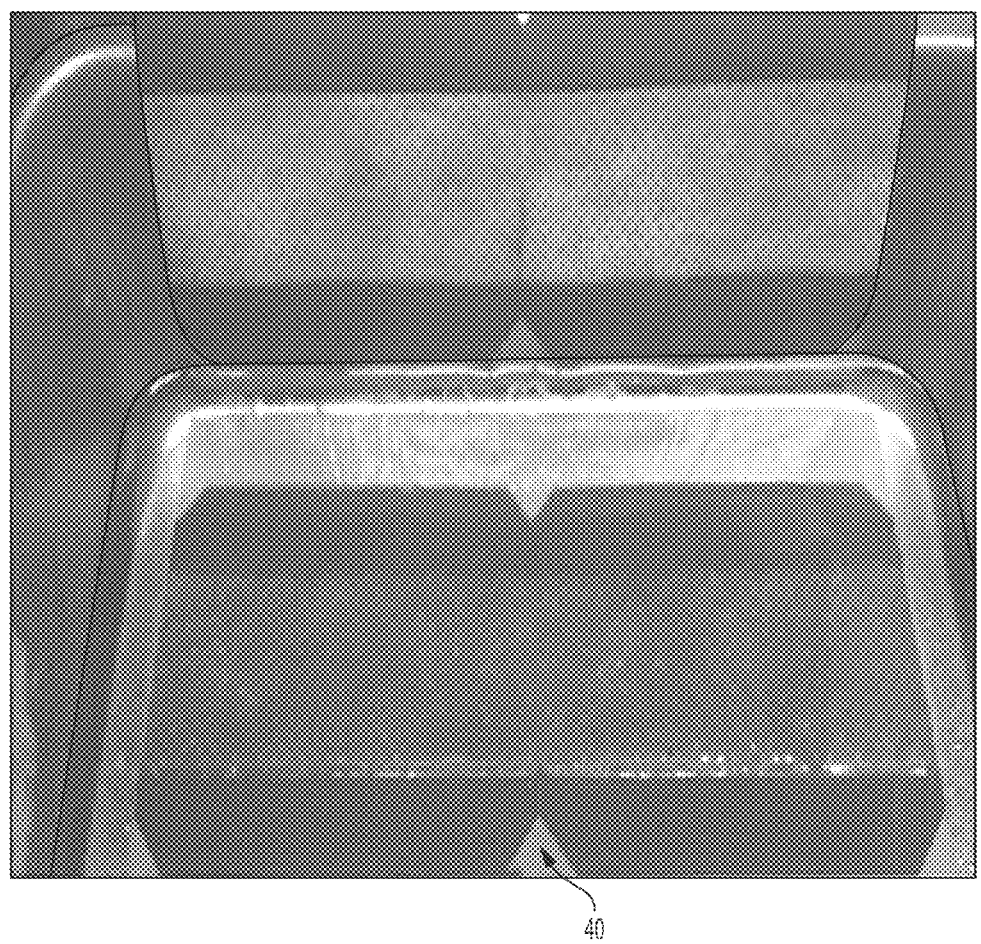
FIG. 10 depicts a multilayer fuel indicating tape with a polyethylene mesh exposed to fuel according to one or more embodiments shown and described herein.

Polyethylene mesh (New PIG®—Color Flare material without dyed wax) can be used as the penetration layer if clear tape with perforations/notches (allow tearing/fuel penetration) is added to the tape construction to protect the mesh during storage and unwinding from the roll of tape. As FIG. 10 shows, the four layered tape constructed from 3M 853 (clear tape) with perforations/polyethylene mesh/3M 924 (gels)/3M Red 471 changes from white to red upon submersion in fuel for 1 hour. It should be noted that the tape remained intact after 3 day submersion.

Figure 11:
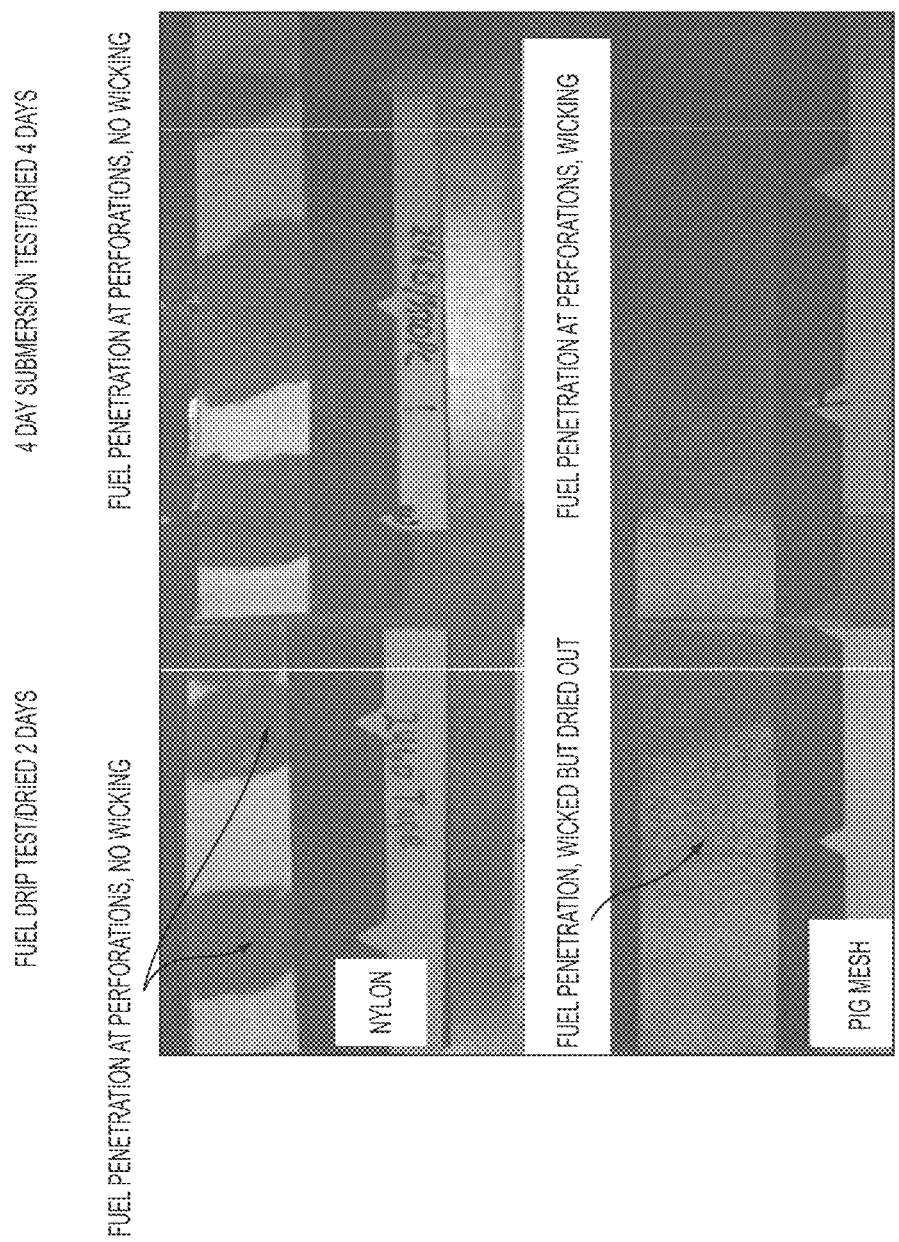
FIG. 11 depicts a multilayer fuel indicating tape with ribbon and mesh according to one or more embodiments shown and described herein.

When 3M 853 (i.e., protection layer is clear tape with perforations) and white ribbon or polyethylene mesh (i.e., penetration layer) with 3M 924 (gels)/3M Red 471 (i.e., reaction layer) multilayered tape was exposed to fuel drips or four day submersions in fuel and then dried for 2 to 4 days, the multilayered tapes underwent different levels of color changes as shown in FIG. 11. For the polyethylene mesh construction, the fuel had trouble penetrating the perforations at the center of the tape during the fuel drip test producing minimal persistent color changes after 2 days of drying. During the submersion test, the fuel was able to penetrate and then wick away from the perforations and cut end of the polyethylene tape to produce a persistent (lasted over a month) color change in the entire length of the submerged tape.

In contrast to the resistance to fuel penetration in the protected polyethylene mesh tape, the fuel was able to penetrate and cause a persistent (over 1 month) color change at both the perforations and cut ends of the multilayered tape constructed with white satin ribbon regardless of the method or length of fuel exposure. Even though the fuel was able to penetrate the perforations/cut ends easily, the fuel did not wick away from the areas of penetration such that the color changes could be used to determine the areas where the fuel made direct contact with the tape. In other words, the tape made knowing where the fuel made contact with the tape visually apparent and could be used to better identify the point of origin (leak) and path of the leaking fuel flow.

Figure 12:
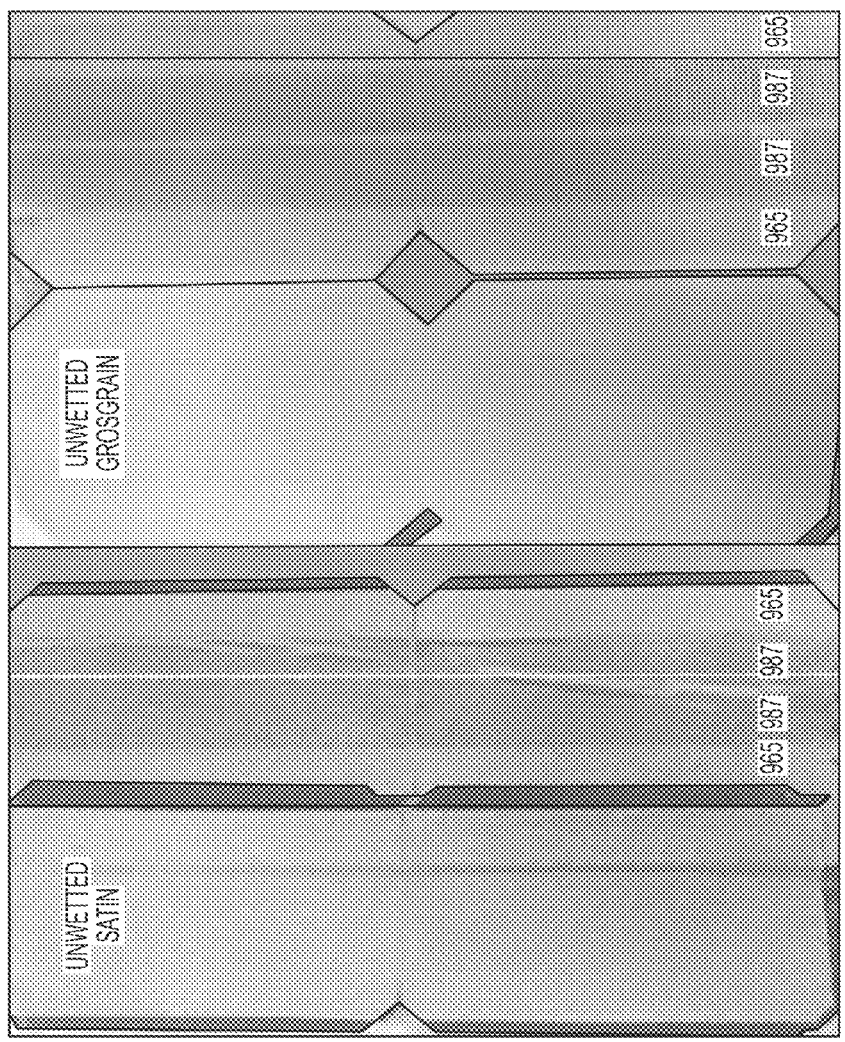
FIG. 12 depicts a multilayer fuel indicating tape with different adhesives according to one or more embodiments shown and described herein.

When three-layered tapes constructed from white satin or grosgrain ribbon/3M 987 (gels) and 3M 965 (resistant) adhesive transfer strips laid parallel/3M Red 471 were submerged in fuel for 4 days they went through color changes similar to those shown in FIG. 8. After drying for 7 days, both multilayered tapes had white edges hereinbefore the 965 adhesive strips and dark pink/red stripes hereinbefore the gelled 987 adhesive strips in FIG. 12. The chemical resistant 965 adhesive strips inhibit separation of the tape and kept the gelled 987 adhesive contained during long periods of submersion and the resulting white edges can be used to determine the color of the leaking liquid.

Figure 13:
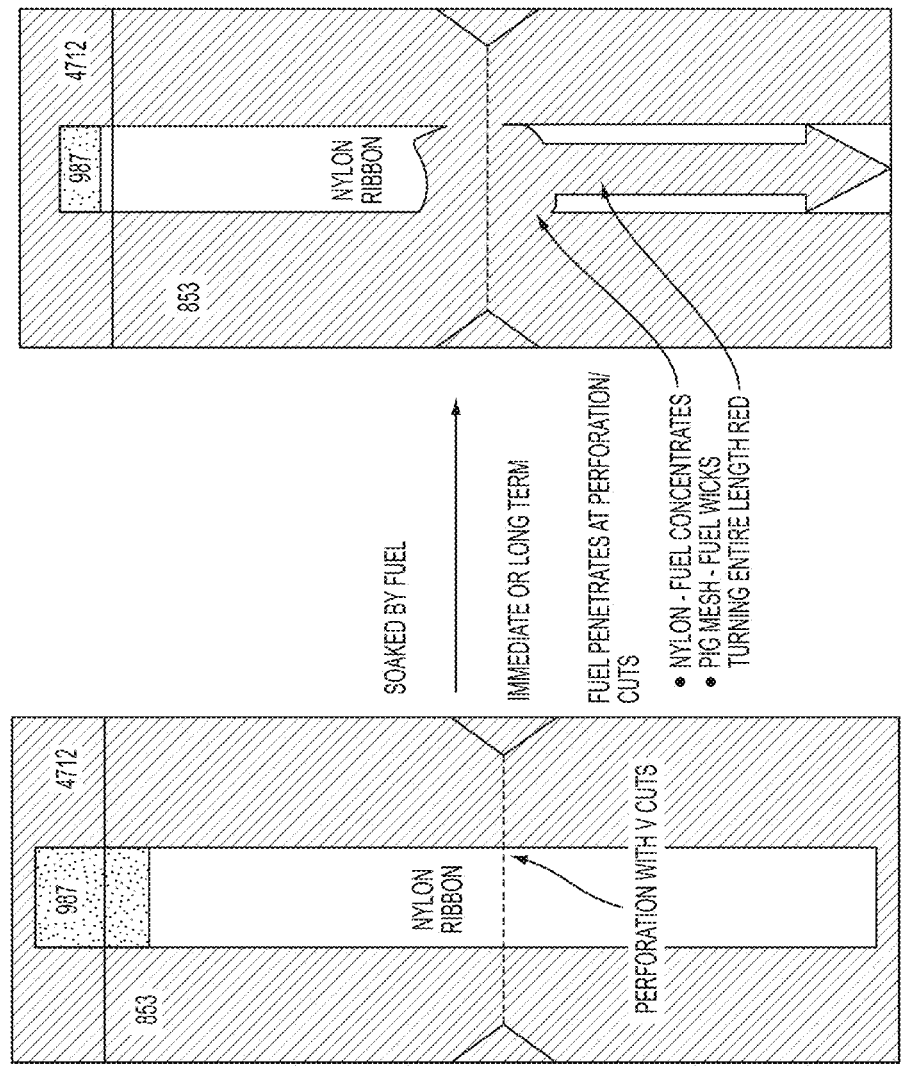
FIG. 13 illustrates the construction of a multilayered tape according to one or more embodiments shown and described herein.

FIG. 13 illustrates a multilayered tape with a clear tape outer layer (protection layer) as shown in FIGS. 6, 10, and 11. 4712, as shown in the drawings, is a commercial version of 471 discussed hereinbefore. The clear tape may be a 3M 853 clear tape which comprises a fuel resistant adhesive. The clear tape may be used to both protect the white porous layer (i.e., penetration layer) and hold the multilayered tape together. The penetration layer may be nylon, cotton or blended ribbon, PIG® polypropylene mesh, vent tape, absorbent paper, non-absorbent paper, tissue paper, single-sided coated paper or other opaque, porous layer. The reaction layer may be one type of acrylic adhesive 3M 987 or 924 which is an adhesive that gels in presence of fuel. The backing layer may be a red vinyl tape with rubber adhesive.

Figure 14:
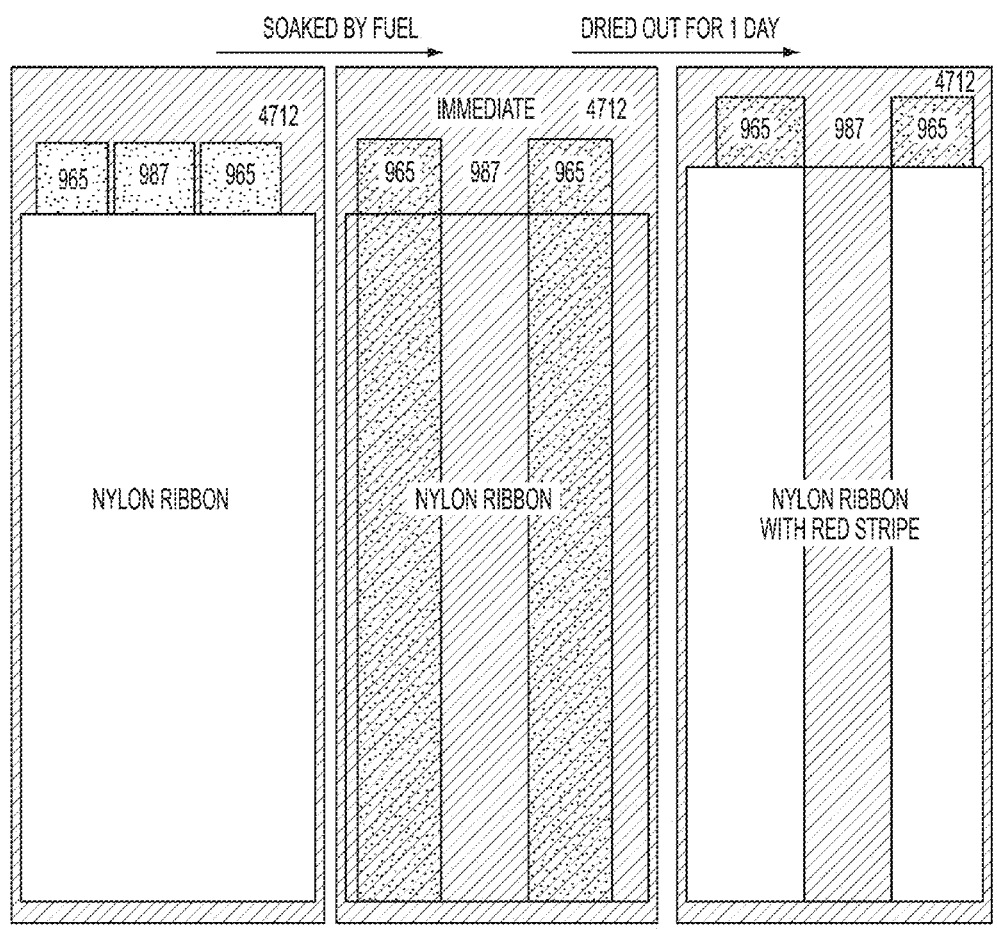
FIG. 14 illustrates the construction of a multilayered tape according to one or more embodiments shown and described herein.

FIG. 14 illustrates a multilayer tape with a ribbon outer layer as shown in FIGS. 7-9, and 12. The penetration layer may be nylon, cotton or blended ribbon, polyethylene (freezer) or siliconized polyethylene (one-sided liner) one-side coated paper or other opaque, porous layer. The reaction layer may be two types of acrylic adhesives: 3M 965 or 467MP transfer or 3M 9500PC double-sided tape which is fuel resistant and is used to hold the multilayer tape layers together during submersion in fuel; and 3M 987 or 924 transfer or 3M 444 double-sided tape which gels in presence of fuel making the penetration layer persistently translucent. The backing layer is a red vinyl tape with rubber adhesive. The rubber adhesive is preferable for the backing layer for non-persistent applications while acrylic, epoxy and other adhesives could be used for persistent applications or where clean removal is not a priority.

In one embodiment, the penetration layer 10 (FIG. 1) may comprise paper or paper derivatives such that penetration layer 10 becomes indistinguishable from the subsequent layers when the liquid indicator 5 is exposed to or in the presence of the escaping liquid. In other words, the penetration layer 10 may be transparent when the liquid indicator is exposed to or in the presence of the escaping liquid. Referring now to FIG. 15, in one embodiment, the penetration layer 10 may be paper such as a lined paper. The side of the penetration layer 10 with the lines is applied to the reaction layer 15 such that the lines are not visible when the liquid indicator 5 is dry. As discussed hereinafter, when the liquid indicator 5 is exposed to or in the presence of the escaping liquid, the penetration layer becomes transparent and the lines become visible along with the indication color.

The protection layer 30 may be any material that coats the liquid indicator 5 such as the examples and embodiments discussed hereinbefore. In this embodiment, the protection layer 30 is a chemical resistant material coated onto one surface of the penetration layer 10. In other words, the chemical resistance material is not a tape or other solid form when applied to the penetration layer 10. For example, and not limited to, the chemical resistant material may be siliconized polyethylene (e.g., one-sided liner paper where the paper is the penetration layer), high density polyethylene (e.g., freezer paper where the paper is the penetration layer), adhesive with high cross-linking, waxed paper, polyglycol or polyester wax, beeswax, fluorinated waxes such as Scotch guard spray, or the like. In one embodiment, the coating may allow the liquid indicator 5 to be folded or wound upon itself and allow the liquid indicator to unwind cleanly, without sticking to itself. The protection layer 30 may require liquid pathways 35 to allow the escaping liquid to reach the reaction layer 15.

FIG. 15 illustrates a separation resistant liquid indicator 50. The intermediate layer 55 may include gaps 70 to increase escaping liquid intrusion into the intermediate layer 55. In one embodiment, the liquid sensitive area 60 may be in the middle of the separation resistant liquid indicator 50. In one embodiment, as shown in FIG. 15, the liquid sensitive area 60 may be along the edges of the separation resistant liquid indicator 50. This may allow for increased exposure of the liquid sensitive areas 60 to the escaping liquid, increase adhesion after prolonged submersion in the escaping liquid, and still maintain the structural integrity of the separation resistant liquid indicator 50 after prolonged exposure to the escaping liquid.

Figure 16:
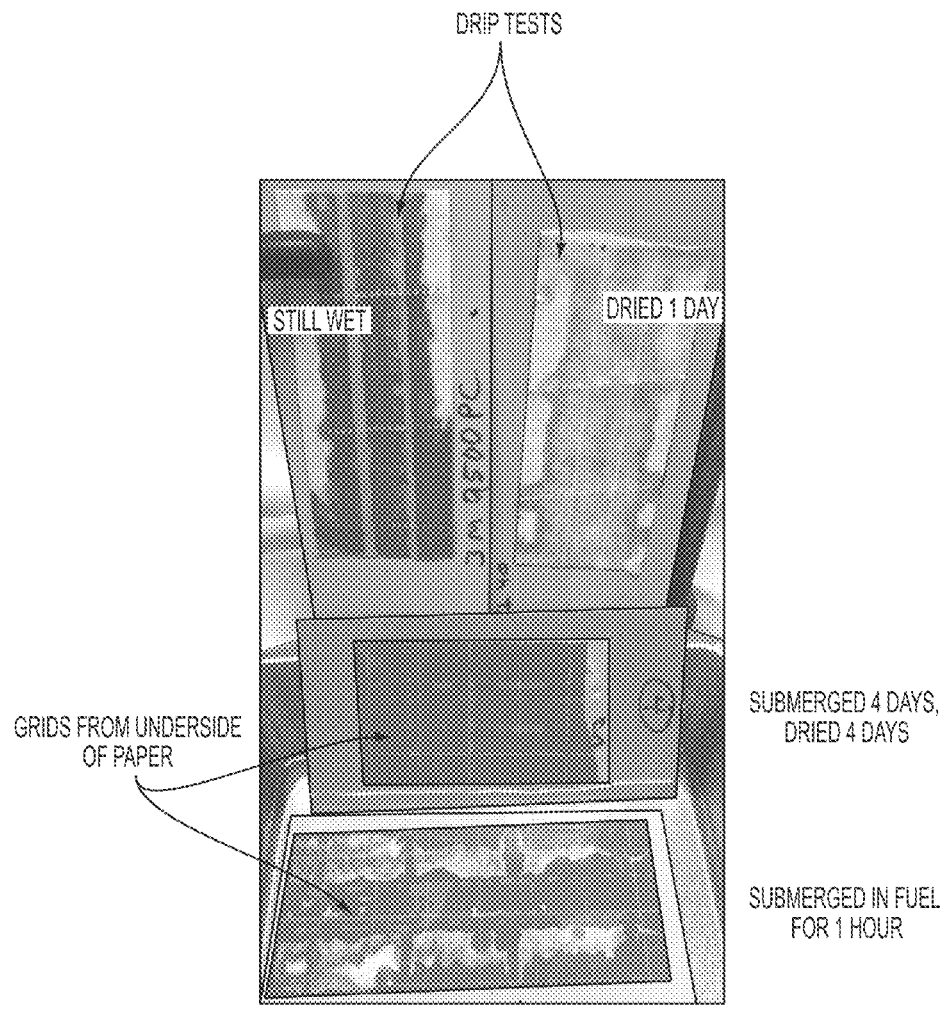
FIG. 16 depicts the separation resistant liquid indicator according to one or more embodiments shown and described herein.

FIG. 16 depicts a separation resistant liquid indicator 50 with the coated paper penetration layer 10 as described hereinabove. The lines on the penetration layer 10 are visible when the penetration layer 10 is exposed to or in the presence of the escaping liquid. It should be noted that the liquid resistant area 65 in the center of the separation resistant liquid indicator 50 returns to a whitish color after the separation resistant liquid indicator 50 dries. The return of the layer color of the penetration layer 10 to white may allow visible identification of a liquid color of the escaping liquid in addition to the indication color of the liquid sensitive areas 60 indicating exposure to or the presence of the escaping liquid. The layer color is described in greater detail in regards to FIGS. 4 and 5 hereinabove.

The liquid indicator as described hereinbefore may be positioned by a joint in a plumbing network to monitor and indicate when a leak of escaping fluid is present at the joint. For example, and not limited to, the plumbing network may be on a vehicle such as an aircraft, boat, land vehicle, submarine, and the like, liquid depot, liquid distribution station, pipeline, storage tank, liquid reservoir for equipment, fluid filled components, mixer, pumps, and the like. The joint may be any connection interface between liquid storage, liquid distribution, and liquid devices. For example, but not limited to, a joint may be between a pipe and a bladder, a pipe and a liquid tank, two or more pipes, a pipe and a pipe fitting, a pipe and a nozzle, a pipe and a hose, and the like. The pipe may be, for example, a hose, a conduit, or a channel.

"Dried" as used throughout indicates that the escaping liquid as either drained or evaporated. The drying is dependent on the volatility of the escaping liquid. For example, and not limited to, volatile escaping liquids primarily evaporate while a non-volatile liquid primarily drain away from the liquid indicator.

It should be noted that "exposed to" and "in the presence of" were used throughout and indicate that the escaping liquid is able to interact with the liquid indicator and where one is used without the other does not indicate exclusivity of the other. Both terms may be used interchangeably.

The liquid indicator described herein uses a solvent based adhesive to generate/provide an indication that the liquid indicator has, at some time in the past, been exposed to, or in the present, is exposed to an escaping liquid from a container. The solvent based adhesive is tailored to the escaping liquid in which indication is desired. The liquid indicator may be positioned where knowledge of the presence of escaping liquid, either present or past, is desired.

Unless otherwise defined, all technical and scientific terms used herein have the same meaning as commonly understood by one of ordinary skill in the art to which the claimed subject matter belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

It is noted that terms like "preferably," "commonly," and "typically" are not utilized herein to limit the scope of the appended claims or to imply that certain features are critical, essential, or even important to the structure or function of the claimed subject matter. Rather, these terms are merely intended to highlight alternative or additional features that may or may not be utilized in a particular embodiment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Certain terminology is used in the disclosure for convenience only and is not limiting. The words "left", "right", "front", "back", "upper", and "lower" designate directions in the drawings to which reference is made. The terminology includes the words noted hereinbefore as well as derivatives thereof and words of similar import.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A persistent color change liquid indicator, comprising:
a backing layer;
a penetration layer; and
a reaction layer interposed between the backing layer and the penetration layer, wherein:
the backing layer comprises an indication color;
the penetration layer comprises liquid structure to allow a liquid to travel through the penetration layer to the reaction layer;
the penetration layer is opaque when dry and translucent when exposed to the liquid is to allow the indication color to be visible; and
the reaction layer reacts to the presence of the liquid such that the visibility of the indication color persists after exposure to the liquid ceases.

2. The liquid indicator of claim 1, wherein the indication color contrasts with a layer color of the penetration layer.

3. The liquid indicator of claim 1, wherein the penetration layer comprises a layer color and the layer color provides for visible identification of a liquid color of the escaping liquid.

4. The liquid indicator of claim 1, wherein the penetration layer is a woven material.

5. The liquid indicator of claim 4, wherein the woven material comprises nylon, polyester, cotton, or cotton blend.

6. The liquid indicator of claim 1, wherein the penetration layer is a porous material.

7. The liquid indicator of claim 6, wherein the porous material comprises a polyethylene mesh, polyester mesh, non-absorbent paper, or absorbent paper.

8. The liquid indicator of claim 1, wherein the reaction layer is an adhesive that gels in the presence of the liquid such that the backing layer can be separated from the penetration layer.

9. The liquid indicator of claim 8, wherein the reaction layer is a solvent based adhesive.

10. The liquid indicator of claim 1, wherein the reaction layer is an acrylic adhesive with limited cross-linking.

11. The liquid indicator of claim 1, wherein:
the persistent color change indicator further comprises a protection layer;
the penetration layer is interposed between the protection layer; and
the reaction layer and comprises one or more liquid pathways in which the liquid travels to the penetration layer.

12. The liquid indicator of claim 11, wherein the protection layer is a nonporous, chemical resistant layer.

13. The liquid indicator of claim 11, wherein the protection layer comprises a clear tape and a chemical resistant adhesive.

14. The liquid indicator of claim 11, wherein the protection layer is a chemical resistant coating applied directly to one surface of the penetration layer.

15. The liquid indicator of claim 14, wherein the applied coating is high density polyethylene or siliconized polyethylene.

16. The liquid indicator of claim 11, wherein the liquid pathways are perforations in the protection layer.

17. The liquid indicator of claim 16, wherein the liquid indicator comprises indentations positioned along the length of the liquid indicator.

18. The liquid indicator of claim 1, wherein the liquid is a fuel, an organic liquid, a colorless oil, a colored oil, a refrigerant, a grease, or a solvent.

19. The liquid indicator of claim 1, wherein the backing layer, the reaction layer, and the penetration layer are packaged as a tape with a structural adhesive coupled to the backing layer on an opposite side from the indication color.

20. A separation resistant liquid indicator comprising:
a penetration layer;
a backing layer; and
an intermediate layer, wherein:
the backing layer comprises an indication color;
the penetration layer comprises liquid structure to allow a liquid to travel through the penetration layer to the intermediate layer;
the penetration layer is opaque when dry and translucent when exposed to the liquid is to allow the indication color to be visible; and
the intermediate layer comprises one or more liquid sensitive areas and one or more liquid resistant areas, wherein:
the one or more liquid sensitive areas reacts to the presence of the liquid such that the visibility of the indication color persists after exposure to the liquid ceases, and
the one or more liquid resistant areas maintain the structural integrity of the separation resistant liquid indicator after exposure to the liquid.

* * * * *

UNITED STATES PATENT AND TRADEMARK OFFICE
CERTIFICATE OF CORRECTION

PATENT NO. : 9,983,089 B2  
APPLICATION NO. : 15/095396  
DATED : May 29, 2018  
INVENTOR(S) : Robert E. Kauffman Page 1 of 1

It is certified that error appears in the above-identified patent and that said Letters Patent is hereby corrected as shown below:

On the Title Page

Item (57) Abstract, Line 7:
"liquid is to allow the indication color to be visible. The"
Should read:
--liquid to allow the indication color to be visible. The--; and In the Claims Column 13, Line 49, Claim 1:
"when exposed to the liquid is to allow the indication"
Should read:
--when exposed to the liquid to allow the indication--; and Column 14, Line 52, Claim 20:
"when exposed to the liquid is to allow the indication"
Should read:
--when exposed to the liquid to allow the indication--.

Signed and Sealed this
Sixteenth Day of April, 2019

Andrei Iancu
*Director of the United States Patent and Trademark Office*